United States Patent
Ko

(10) Patent No.: US 7,906,864 B2
(45) Date of Patent: Mar. 15, 2011

(54) APPARATUS AND METHOD OF CONTROLLING GENERATION OF ELECTRIC POWER IN VEHICLE

(75) Inventor: Sung Suk Ko, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 586 days.

(21) Appl. No.: 11/965,616

(22) Filed: Dec. 27, 2007

(65) Prior Publication Data
US 2009/0115378 A1   May 7, 2009

(30) Foreign Application Priority Data
Nov. 7, 2007   (KR) .................. 10-2007-0113219

(51) Int. Cl.
*H02P 9/04* (2006.01)
(52) U.S. Cl. ............. 290/40 C; 320/134; 322/25; 701/22
(58) Field of Classification Search ............. 290/40 A, 290/40 B, 40 C; 322/25; 320/134; 701/22
See application file for complete search history.

(56) References Cited

U.S. PATENT DOCUMENTS

| 6,166,523 | A  | * | 12/2000 | Singh et al. ............. 320/132 |
| 6,608,482 | B2 | * | 8/2003  | Sakai et al. ............. 324/426 |
| 6,629,027 | B2 | * | 9/2003  | Yamaguchi et al. ....... 701/22   |
| 7,023,102 | B2 | * | 4/2006  | Itoh ........................ 290/40 C |
| 2004/0025525 | A1 |  | 2/2004  | Kubo et al. |
| 2005/0088148 | A1 | * | 4/2005 | Kubo et al. ............. 320/137 |
| 2008/0309094 | A1 | * | 12/2008 | Molen et al. ............. 290/40 C |

FOREIGN PATENT DOCUMENTS

| JP | 06-113599      | 4/1994 |
| JP | 2002-272012    | 9/2002 |
| KR | 2003-0005408   | 1/2003 |
| KR | 10-2004-0078430 | 9/2004 |

* cited by examiner

*Primary Examiner* — Michael C Zarroli
(74) *Attorney, Agent, or Firm* — Morgan, Lewis & Bockius LLP

(57) ABSTRACT

The present invention relates to an apparatus for controlling generation of electric power in a vehicle that is capable of calculating a target state of charge (SOC) of a battery on the basis of a SOC of the battery and an amount of accumulated current according to individual driving modes and performing a feedback control on generation of an alternator to follow the target SOC, thereby maintaining an optimal SOC and improving fuel efficiency.

7 Claims, 3 Drawing Sheets

APPARATUS AND METHOD OF CONTROLLING GENERATION OF ELECTRIC POWER IN VEHICLE

CROSS-REFERENCE RO RELATED APPLICATION

This application claims priority to and the benefit of Korean Patent Application No. 10-2007-0113219, filed in the Korean Intellectual Property Office on Nov. 7, 2007, the entire contents of which are incorporated herein by reference.

BACKGROUND OF THE INVENTION (a) Field of the Invention

The present invention relates to an apparatus for controlling generation of electric power in a vehicle, and more particularly, to an apparatus and a method of controlling generation of electric power in a vehicle that is capable of calculating a target state of charge (SOC) of a battery on the basis of a SOC of the battery and an amount of accumulated current according to individual driving modes and performing a feedback control on generation of an alternator to follow the target SOC, thereby maintaining an optimal SOC and improving fuel efficiency.

(b) Description of the Related Art

Vehicle makers throughout the world have used various technologies for improving fuel efficiency in order to overcome high oil prices. Examples of the technologies for improving fuel efficiency include a system for controlling generation of electric power.

The system for controlling generation of electric power allows an engine control unit to read information for the current, voltage, and temperature of a battery from various sensors mounted on electrodes of the battery, determines a target generating voltage according to driving modes of a vehicle, such as an acceleration mode, a deceleration mode, a constant-speed mode, and an idle mode, on the basis of the read information, and controls driving of an alternator to control the generation of electric power.

The system for controlling generation of electric power charges and stores regenerative energy generated during the deceleration mode in the battery, and uses the energy charged in the battery in the acceleration mode, the constant-speed mode, and the idle mode to decrease the generation of the alternator, thereby minimizing fuel consumption.

In a general vehicle, even when the SOC of the battery is normal, the alternator supplies to the battery, not only the current consumed in the vehicle but also a surplus current of several amperes to prevent the battery from being discharged. The system for controlling generation of electric power controls the amount of the surplus current, which is supplied to prevent the battery from being discharged, to be approximately zero, thereby decreasing the unnecessary generation of the alternator.

The vehicle uses the system for controlling generation of electric power to achieve not only the above-described objects but also various objects.

According to a technology that is disclosed in Korean Patent laid-open Publication No. 2004-0078430, in the case where, when an engine is in an idle mode, as the result of monitoring a battery voltage, the battery voltage decreases for a predetermined time at a predetermined voltage or less, a control operation is formed such that RPM of the engine is maintained to be adaptable for a current state of the battery regardless of current consumers.

Accordingly, according to this technology, it is possible to prevent exhaust gas and noise from being excessively generated and the battery from being overdischarged due to the overload in an idle mode, which results in preventing starting-off of the vehicle from occurring in advance.

According to a technology that is disclosed in Korean Patent laid-open Publication No. 2003-0005408, allowable power supplied to current consumers is determined oil the basis of generation allowed in a generating unit and a discharge allowed in a charging unit, and power consumption of an air conditioning unit is calculated to increase power supplied to the air conditioning unit within a range of the allowable power, thereby controlling the generation of the generating unit in the range of allowable generation.

Accordingly, according to this technology, it is possible to prevent traveling of the vehicle from being affected due to the power consumption by the air conditioning unit.

According to a technology that is disclosed in Japanese Patent Laid-open Publication No. 06-113599, a generation stop control operation is performed for a predetermined time only in the case where driving information of the engine is maintained in a predetermined normal range, thereby preventing the battery from being excessively discharged.

According to a technology that is disclosed in Japanese Patent Laid-open Publication No. 14-272012, a state of a battery is measured through a current sensor that is disposed on a power line of the battery to determine a generating target voltage, thereby performing a generation control operation, and in the case where a voltage of the battery detected during the generation control process is within an abnormal determination range, it is determined that a charging system is abnormal.

A generation control logic of a generation control system, which is currently used in the vehicle for the purpose of improving fuel efficiency, is divided into a bulk mode, an absorption mode, and a float mode according to the SOC of the battery.

In the bulk mode, all generation control operations are prohibited and the SOC is maintained. In the absorption mode and the float mode, according to each of driving modes, such as an acceleration mode, a deceleration mode, a constant-speed mode, and an idle state, a target voltage is separately set, and a generation control operation is performed.

However, according to the above-described generation control logic of the related art that is applied in the vehicle, it is very difficult to save fuel consumption because of a structural problem.

For example, even though the driving state is in a deceleration mode, a time required to control the charged energy and the target voltage should be changed according to the SOC of the battery. However, in the current generation control logic, since the function is not applied flexibly, it is not possible to achieve an effect of saving fuel consumption.

Further, a surplus current, which is supplied to the battery to prevent discharging, needs to be controlled to become zero for various current consumers and driving modes. However, in the generation control logic in accordance with the related art, since this control function is not applied flexibly, it is difficult to control the surplus current to become zero.

Further, since charging efficiency is changed according to the temperature of a battery electrolyte solution and the charged amount is changed according to the SOC of the battery, the generation control prohibition period after the starting-on should be changed according to each state. However, because the current generation control logic operates as a time constant, it is not possible to actively and stably perform the generation control according to each state of the battery.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method of controlling generation of electric power in a vehicle, having advantages of extracting a target state of charge of a battery on the basis of an amount of accumulated current and a state of charge of the battery according to each driving condition, stably maintaining the state of charge of the battery by performing generation control to follow the target state of charge through a feedback control on a charging voltage, and improving fuel efficiency.

The present invention has been made in an effort to provide an apparatus and method of controlling generation of electric power in a vehicle, having advantages of sequentially performing charging control, discharging control, and target charging control immediately after starting-on of an engine and performing generation control to follow a target state of charge of a battery calculated on the basis of a state of charge of the battery and an amount of accumulated current.

An exemplary embodiment of the present invention provides an apparatus for controlling generation of electric power in a vehicle. The apparatus includes an ignition detector that provides information on starting on/off of an engine to a controller; a battery detector that is mounted on an electrode of a battery and provides information for determining a state of charge (SOC) of the battery to the controller; an engine RPM detector that provides information on an engine RPM to the controller; a vehicle speed detector that provides information on a traveling vehicle speed to the controller; a throttle opening detector that provides information on an opening of a throttle valve to the controller; an accelerator pedal detector that provides information oil displacement of a accelerator pedal to the controller; the controller that synthesizes information of the battery and traveling conditions of the vehicle according to starting-on of the engine and sequentially performs charging control, discharging control, and target charging control; and an alternator that generates a voltage according to a control signal from the controller and follows a target SOC.

Another embodiment of the present invention provides a method of controlling generation of electric power in a vehicle. The method includes a step of determining whether starting-on of an engine is detected or not; a charging control step of detecting information for a battery when the starting-on of the engine is detected, determining a target state-of-charge (SOC) voltage, and controlling the generation of an alternator to be maintained at a high level; a discharging control step of controlling the generation of the alternator to be maintained at a low level until energy stored by the charging control reaches a target amount of accumulated current according to the SOC of the battery in an acceleration mode, an idle mode, or a constant-speed mode, when the charging control is completed; and a target SOC control step of determining; a substantial target SOC of the battery when the charging control and the discharging control are completed, and performing a feedback control on the generation of the alternator to follow the target SOC.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
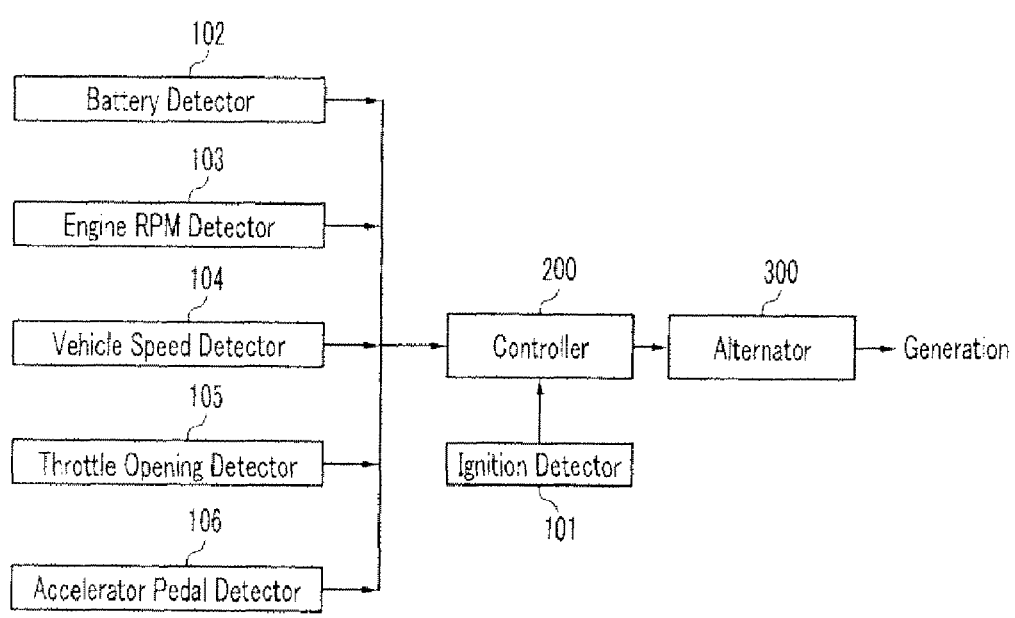
FIG. 1 is a schematic view illustrating the structure of an apparatus for controlling generation of electric power in a vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

<Description of Reference Numerals Indicating Primary Elements in the Drawings>

| | |
|---|---|
| 101: ignition detector | 102: battery detector |
| 103: engine RPM detector | 104: vehicle speed detector |
| 105: throttle opening detector | 106: accelerator pedal detector |
| 200: controller | 300: alternator |

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a schematic view illustrating the structure of an apparatus for controlling generation of electric power in a vehicle according to an exemplary embodiment of the present invention.

As shown in FIG. 1, an apparatus for controlling generation of electric power in a vehicle according to an exemplary embodiment of the present invention includes an ignition detector 101, a battery detector 102, an engine RPM detector 103, a vehicle speed detector 104, a throttle opening detector 105, an accelerator pedal detector 106, a controller 200, and an alternator 300.

The ignition detector 101 provides information for starting-on/off of an engine to the controller 200.

The battery detector 102 includes a current sensor, a voltage sensor, and a temperature sensor. The battery detector 102 is mounted on an electrode of a battery, and detects information on the current, voltage, and temperature at the present time to determine a state of charge (SOC) of the battery, and provides the detected information to the controller 200.

The engine RPM detector 103 is composed of a crank angle sensor or a cam angle sensor, and provides information for a current engine RPM, which is obtained oil the basis of a change in an angle of a crankshaft or a change in an angle of a camshaft, to the controller 200.

The vehicle speed detector 104 is composed of a wheel speed sensor mounted on each wheel or a speed sensor mounted on an output shaft of a transmission, and detects a current traveling vehicle speed and provides it to the controller 200.

The throttle opening detector 105 detects an opening of a throttle valve that is interlocked with an accelerator pedal and controls the flow of air suck in a combustion chamber, and provides the detection result to the controller 200.

The accelerator pedal detector 106 detects displacement of the accelerator pedal that is activated by a driver and provides the detection result to the controller 200.

The controller 200 synthesizes traveling conditions of the vehicle that are analyzed on the basis of information for starting-on of the engine provided by the ignition detector 101, information for the current, voltage, and temperature of the battery provided by the battery detector 102, and information provided by the engine RPM detector 103, the vehicle speed detector 104, the throttle opening detector 105, and the accelerator pedal detector 106. Then, the controller 200 sequentially determines a target charging voltage (target generation) to perform charging control, a target charging voltage (target generation) to perform discharging control, and a target charging voltage (target generation) to perform target charging control, and performs a feedback control on the alternator 300 to control the generation as explained later.

The alternator 300 generates a voltage according to a control signal that is instructed from the controller 200, and supplies the voltage to various current consumers mounted in the vehicle and supplies the voltage to the battery as the charging voltage.

Figure 2:
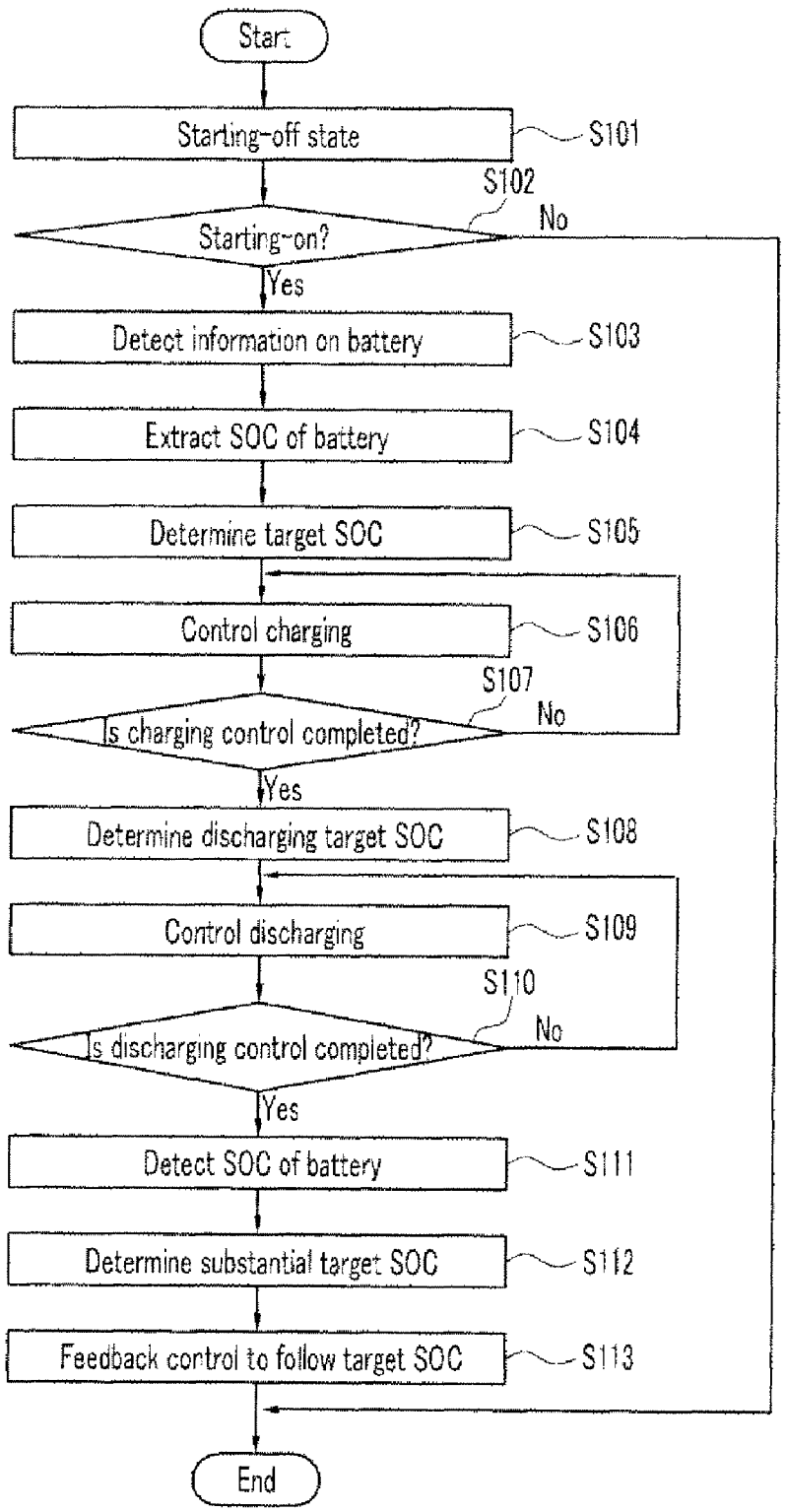
FIG. 2 is a flowchart illustrating a process of controlling generation of electric power in a vehicle according to an exemplary embodiment of the present invention.
Figure 3:
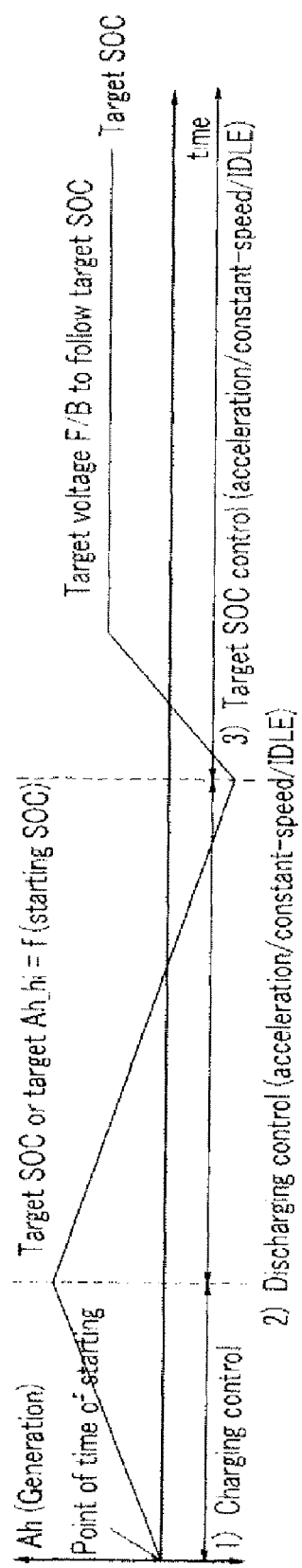
FIG. 3 is a timing chart illustrating a process of controlling generation of electric power in a vehicle according to an exemplary embodiment of the present invention.

The operation of the apparatus for controlling generation of electric power in a vehicle that has the above-described structure will now be described with reference to FIGS. 2 and 3 according to an exemplary embodiment of the present invention.

In a state where the engine of the vehicle is in a starting-off mode (Step S101), the controller 200 determines whether starting-on of engine is detected by the ignition detector 101 (Step S102).

When it is determined in Step S102 that the starting-on of the engine is detected, information for the current, voltage, and temperature of the battery is detected by the battery detector 102 mounted on a battery terminal (not shown) (Step S103), and the SOC of the battery is determined (Step S104).

Then, the controller determines a voltage in a target SOC, based oil the extracted SOC of the battery (Step S105), and the alternator 300 is controlled until a voltage reaches the voltage in the target SOC, thereby performing the charging control (Step S106).

That is, a target amount of accumulated current is determined according to the SOC of the battery at the time of starting-on, all generation control operations may be prohibited until the amount of accumulated current reaches the target amount of accumulated current, and the target charging voltage is maintained at a high voltage so as to increase the generation of the alternator 300.

The period of the charging control, which is performed immediately after the starting-on of the engine, is determined according to the SOC of the battery at the time of starting-on.

The SOC of the battery is determined on the basis of the current, voltage, and temperature of the battery that are detected by the battery detector 102, and the amount of accumulated current signifies a current value accumulated on the basis of the time while the engine is driven.

In a state where the generation control is performed on the basis of the target charging voltage according to the starting-on of the engine, it is determined whether the charging control based on the target charging voltage is completed (Step S107).

When it is determined in Step S107 that the charging control based on the target charging voltage is completed, the full charging of the battery is maintained. Thus, the discharging target SOC according to the driving modes of the vehicle is determined (Step S108), and the discharging control is performed.

That is, on the basis of the information, such as a current engine RPM detected by the engine RPM detector 103, a traveling vehicle speed detected by the vehicle speed detector 104, an opening of the throttle valve detected by the throttle opening detector 105, and displacement of the accelerator pedal detected by the accelerator pedal detector 106, it is determined whether the vehicle is in an acceleration mode, a constant-speed mode, a deceleration mode, or an idle mode. Then, the discharging target charging state is determined according to the detected mode, and the discharging control is performed.

In the discharging control, the energy, which is stored in the battery when the charging control is performed immediately after the starting-on of the engine, is used to be supplied to the current consumer in the acceleration, constant-speed, and idle modes. Thus, the generation control is performed on the alternator 300 by setting the voltage in the target SOC at a low voltage, so as to minimize the fuel consumption.

In addition, the generation control is continuously maintained until the amount of accumulated current reaches the target amount of accumulated current according to the SOC of the battery.

However, in the deceleration mode, the energy may be maximally used by maintaining the voltage in the target SOC at a high voltage.

Then, it is determined whether the SOC reaches the target SOC according to the discharging control in Step S109 (Step S110). When it is determined that the SOC reaches the target SOC, the information for the current, voltage, and temperature of the battery is analyzed, and the SOC is detected (Step S111).

Then, after determining the target SOC to perform feedback control (Step S112), the feedback control is performed on the operation of the alternator 300, thereby performing the generation control in the target SOC to follow the target SOC (Step S113).

The generation control in the target SOC is performed when the charging control period and the discharging control period end immediately after the starting-on of the engine. The feedback control is performed on the target voltage to maintain the target SOC.

During this period, fuel consumption is reduced by making a surplus current, which is supplied to the battery to prevent the discharging, substantially zero.

However, even in this period, the target voltage is maintained at a high value in the deceleration mode.

According to the embodiment of the present invention that has the above-described structure, it is possible to perform active and stable generation control following the target SOC that is calculated according to each state of the battery immediately after the starting-on of the engine, thereby improving fuel efficiency.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling generation of electric power in a vehicle, the apparatus comprising:
    an ignition detector that provides information on starting on/off of an engine to a controller;
    a battery detector that is mounted on an electrode of a battery and provides information for determining a state of charge (SOC) of the battery to the controller;
    an engine RPM detector that provides information on an engine RPM to the controller;
    a vehicle speed detector that provides information on a traveling vehicle speed to the controller;
    a throttle opening detector that provides information on an opening of a throttle valve to the controller;
    an accelerator pedal detector that provides information on displacement of an accelerator pedal to the controller;
    the controller that synthesizes information of the battery and traveling conditions of the vehicle according to starting-on of the engine and sequentially performs charging control, discharging control, and target charging control; and
    an alternator that generates a voltage according to a control signal from the controller and follows a target SOC;
    wherein the battery detector includes a voltage sensor, a current sensor, and a temperature sensor, and detects information for the voltage, current, and temperature of the battery and provides the detected information to the controller.

2. The apparatus of claim 1, wherein the controller determines a target amount of accumulated current according to the SOC of the battery when starting-on of the engine is detected, and performs the charging control that maintains the target SOC at a high level until an amount of accumulated current reaches the target amount of accumulated current, and increases the generation of the alternator.

3. The apparatus of claim 1, wherein the controller prohibits the controlling generation of the electric power when requested by other current consumers during a charging control period after the starting-on of the engine.

4. The apparatus of claim 1, wherein the controller provides energy stored in the battery during a charging control period according to the starting-on of the engine, to current consumers in an acceleration mode, a constant-speed mode, and an idle mode, sets a target voltage to a low voltage to control the generation of the alternator to be low, and maintains generation control during a discharging control period until an amount of accumulated current reaches a target amount of accumulated current according to the SOC of the battery.

5. The apparatus of claim 1, wherein the controller performs the charging control that performs a feedback control on a target voltage, such that the target SOC is maintained after charging and discharging control periods according to the starting-on of the engine end, while a surplus current supplied to the battery is made zero.

6. The apparatus of claim 4, wherein the controller maintains a target SOC voltage at a high voltage during the discharging control period in the case of a deceleration mode and maximally uses energy that is generated in the deceleration mode.

7. A method of controlling generation of electric power in a vehicle, the method comprising:
    a step of determining whether starting-on of an engine is detected or not;
    a charging control step of detecting information for a battery when the starting-on of the engine is detected, determining a target state-of-charge (SOC) voltage, and controlling the generation of an alternator to be maintained at a high level;
    a discharging control step of controlling the generation of the alternator to be maintained at a low level until energy stored by the charging control reaches a target amount of accumulated current according to the SOC of the battery in an acceleration mode, an idle mode, or a constant-speed mode, when the charging control is completed; and
    a target SOC control step of determining a substantial target SOC of the battery when the charging control and the discharging control are completed, and performing a feedback control on the generation of the alternator to follow the target SOC; and
    wherein, in the discharging control step and the target SOC control step, when deceleration is detected, the target SOC is determined at a high level, and regenerative energy, which is generated due to the deceleration, is maximally used.

* * * * *